Patented July 15, 1941

2,249,694

UNITED STATES PATENT OFFICE 2,249,694

MATERIAL FOR TAKING IMPRESSIONS FOR DENTAL OR OTHER PURPOSES

Sidney William Wilding, London, England, assignor to The Amalgamated Dental Co., Limited, London, England No Drawing. Application September 18, 1939, Serial No. 295,538. In Great Britain September 26, 1938

16 Claims. (Cl. 18—47)

This invention relates to materials for taking impressions and particularly to materials for taking impressions of the human mouth for dental purposes.

An object of the invention is to provide a material which solidifies rapidly when placed in position in the mouth in order that as little inconvenience as possible may be experienced by the patient, and with this object in view the invention consists in the use of an aqueous solution of an alginate in conjunction with calcium sulphate, it being found that such materials produce a stiff elastic gel which when formed in situ give an accurate impression of the mouth which is admirably suited to dental purposes.

The formation of the gel when the aforementioned substances are mixed together is extremely rapid and in order that the material may be effectively employed it is a further object of the invention to provide some means of delaying the gel formation in order to allow sufficient time for the material to be placed in the impression tray and inserted in the mouth.

With this object in mind, therefore, the invention also comprises subjecting the calcium sulphate to heat treatment prior to its mixture with the alginate, it being found that if calcium sulphate is used which has been heated to temperatures above 200° C. the gel formation is delayed.

It is also found, however, that gel formation may be delayed by the addition of certain chemical substances, and the invention also comprises the addition to a mixture of calcium sulphate and an aqueous solution of an alginate, of a soluble salt of an acid capable of forming an insoluble or very sparingly soluble calcium compound.

According to one preferred method of carrying the invention into effect, a gel forming material is formed by mixing a solution of an alginate such as sodium, potassium or ammonium alginate with calcium sulphate which has been heated to a temperature above 200° C. The heat treatment of the calcium sulphate above this temperature causes the calcium sulphate to be converted to the anhydrous form, and it has been found that the higher the temperature used, the slower is the reaction with the soluble alginates.

The heat treatment of calcium sulphate provides, therefore, a means of delaying gel formation to any desired extent. For example, a sample of precipitated calcium sulphate ($CaSO_4 2H_2O$)

when mixed with a solution of sodium alginate, causes gel formation in a few seconds. If another portion of the same sample is heated to 750° C. for 30 minutes, gel formation occurs in two minutes and if a third portion is heated to 1000° for 30 minutes, gel formation is delayed for 20 minutes.

According to an alternative method of carrying the invention into effect a gel forming material is formed by mixing calcium sulphate with a solution of an alginate such as sodium, potassium or ammonium alginate and to which has been added a predetermined amount of a soluble salt of an acid, such as, for example, sodium carbonate, ammonium citrate, sodium oxalate or potassium phosphate, capable of forming an insoluble or very sparingly soluble calcium compound.

The extent to which the formation of the gel will be delayed will be dependent upon the amount of such salt which is added but it is found that in order to delay gel formation to the required extent in the taking of dental impressions, the amount of salt which is required is only a fraction of the chemical equivalent of the calcium present. The action which takes place is thought to be as follows:

The calcium ions going into solution at a comparatively slow rate are continuously removed by the precipitant until the latter is exhausted after which the formation of the calcium alginate gel proceeds without interruption and is quickly completed.

If desired, both these methods may be used in combination, the gel formation being delayed partly by the use of heat treated calcium sulphate, and partly by the addition of a soluble salt of an acid capable of forming an insoluble or very sparingly soluble calcium compound.

In preparing dental impression material in practice it is convenient to adjust the proportions of the mixture so that the commencement of gel formation is delayed for two to three minutes so as to allow sufficient time for the necessary manipulation prior to the insertion in the mouth where the setting of the gel is completed in a further two to three minutes.

In order that the material may have a consistency suitable for taking impressions and in order that the calcium sulphate may be more intimately mixed with the alginates, inert fillers such as powdered asbestos, china clay, ground silica and precipitated calcium carbonate may be added.

Although the proportion of calcium precipitant present is the principal factor in controlling the setting time, the latter is also influenced to some extent by the type of filler employed, by the temperature of the mixture and by the state of subdivision of the various ingredients.

It will be obvious that the invention is capable of various modifications but the following are given as examples of actual materials prepared in accordance with the invention:

Example 1

| | |
|---|---|
| 5% sodium alginate solution ml | 30 |
| Anhydrous sodium carbonate gms | 0.01 |
| Powdered asbestos gms | 15 |
| Anhydrous calcium sulphate gms | 0.75 |

The sodium carbonate is dissolved in the sodium alginate solution and the other ingredients, previously well mixed, are added. The whole is then stirred until a uniform paste is obtained.

It is not necessary to previously dissolve the sodium alginate in water as all the ingredients may be mixed together in the powdered form and subsequently mixed with the requisite quantity of water.

Example 2

| | |
|---|---|
| Sodium alginate gms | 3 |
| Calcium carbonate gms | 20 |
| Sodium phosphate gms | 0.1 |
| Anhydrous calcium sulphate gms | 1.5 |

The ingredients, all finely powdered, are mixed together and made into a paste with 30 mls. of water.

It is more convenient to mix the powders in bulk and subsequently measure out the quantity needed for each impression. There is a danger, however, that on storage, especially in damp climates, the reaction necessary to form the calcium alginate might take place prematurely. In such cases the ingredients may be mixed in such a way that the reacting substances are kept separate.

Example 3

Powder No. 1:

| | |
|---|---|
| Sodium alginate gms | 450 |
| Calcium carbonate gms | 1125 |
| Anhydrous sodium carbonate gms | 15 |

Powder No. 2:

| | |
|---|---|
| Calcium carbonate gms | 1410 |
| Anhydrous calcium sulphate (heated for 30 minutes at 750° C.) gms | 180 |

15 gms. of each powder are weighed out and after mixing together are made into a paste with 30 mls. of water, or if desired Powder No. 1 may be mixed with the water first and Powder No. 2 added immediately before it is desired to take the impression.

Alternatively the above substances instead of being prepared as two separate powders may be mixed together in the form of one powder, having the following composition:

| | |
|---|---|
| Sodium alginate gms | 450 |
| Calcium carbonate gms | 2535 |
| Anhydrous sodium carbonate gms | 15 |
| Anhydrous calcium sulphate (heated for 30 minutes at 750° C.) gms | 180 |

30 gms. of this powder would then be made into a paste with 30 mls. of water.

Example 4

| | |
|---|---|
| Potassium alginate gms | 4.5 |
| Calcium carbonate gms | 25.0 |
| Calcium sulphate (heated for 30 minutes at 850° C.) gms | 2.0 |

The mixed ingredients are made into a paste with 30 mls. of water.

Example 5

| | |
|---|---|
| Ammonium alginate gms | 4.0 |
| Calcium carbonate gms | 25 |
| Precipitated calcium sulphate ($CaSO_4 2H_2O$) gms | 1.8 |
| Anhydrous sodium carbonate gms | 0.3 |
| Water ml | 30 |

It is to be understood, however, that the invention is not limited to these examples since it is capable of many other modifications, and that, furthermore, while it is mainly concerned with a material for taking dental impressions the material may be readily employed in cases where impressions for other purposes are required, or in cases where a plastic mass is required to be moulded so as to form an elastic solid of any desired shape.

I claim:

1. Method of forming a material for taking impressions which comprises mixing calcium sulphate with an aqueous solution of an alginate to form a stiff elastic gel.

2. Method of forming a material for taking impressions which comprises mixing calcium sulphate with an inert filler and an aqueous solution of an alginate to form a stiff elastic gel.

3. Method of forming a material for taking impressions which comprises mixing an aqueous solution of an alginate with previously heated calcium sulphate to form a stiff elastic gel.

4. Method of forming a material for taking impressions which comprises mixing an aqueous solution of an alginate with calcium carbonate and previously heated calcium sulphate.

5. Method of forming a material for taking impressions which comprises mixing an aqueous solution of sodium alginate with calcium sulphate previously heated for approximately 30 minutes at approximately 850° C.

6. Method of forming a material for taking impressions which comprises mixing calcium sulphate with an aqueous solution of alginate and delaying the formation of an elastic gel by the addition of a soluble salt of an acid capable of forming a substantially insoluble calcium compound.

7. Method of forming a material for taking impressions which comprises mixing a soluble salt of an acid capable of forming a substantially insoluble calcium compound with a solution of an alginate and adding calcium sulphate.

8. Method of forming a material for taking impressions which comprises mixing sodium carbonate with an aqueous solution of sodium alginate and adding calcium sulphate.

9. Method of forming a material for taking impressions which comprises mixing sodium carbonate with an aqueous solution of sodium alginate and adding calcium sulphate and calcium carbonate.

10. Material for taking impressions comprising calcium sulphate and an aqueous solution of an alginate.

11. Material for taking impressions comprising calcium sulphate, an aqueous solution of an alginate and an inert filler.

12. Material for taking impressions comprising calcium sulphate, an aqueous solution of an alginate and a soluble salt of an acid capable of forming a substantially insoluble calcium compound.

13. Material for taking impressions comprising calcium sulphate, an aqueous solution of an alginate, an inert filler, and a soluble salt of an acid capable of forming a substantially insoluble calcium compound.

14. Material for taking impressions comprising a mixture of sodium alginate with sodium carbonate, calcium carbonate and anhydrous calcium sulphate.

15. Material for taking impressions comprising heat treated calcium sulphate and an aqueous solution of an alginate.

16. Material for taking impressions comprising sodium alginate, calcium carbonate and calcium sulphate previously heat treated for approximately 30 minutes at approximately 850° C.

SIDNEY WILLIAM WILDING.